United States Patent [19]

Hecker

[11] 4,262,795

[45] Apr. 21, 1981

[54] GRIPPER APPARATUS AND METHOD OF GRIPPING CONTAINERS

[75] Inventor: Michael Hecker, Santa Barbara, Calif.

[73] Assignee: Industrial Automation Corp., Goleta, Calif.

[21] Appl. No.: 912,095

[22] Filed: Jun. 2, 1978

[51] Int. Cl.³ .......................... B65G 47/86; B66C 1/10
[52] U.S. Cl. .................................. 198/479; 198/646; 294/87 R; 414/416
[58] Field of Search ................. 294/87 R, 87.2, 87.22, 294/87.24, 87.26, 90, 110 R, 115; 414/416, 786; 198/479, 486, 646, 651, 653, 695, 696

[56] References Cited

U.S. PATENT DOCUMENTS

| 2,611,493 | 9/1952 | Nordquist | 294/87 R X |
| 2,718,426 | 9/1955 | Nagy | 294/87 R |
| 3,341,242 | 9/1967 | Carson | 294/87.22 X |
| 3,938,847 | 2/1976 | Peyton | 414/416 X |

FOREIGN PATENT DOCUMENTS

2445177 4/1976 Fed. Rep. of Germany .......... 198/651

2248705 5/1975 France .................................. 294/87.22

*Primary Examiner*—James L. Rowland
*Attorney, Agent, or Firm*—Blakely, Sokoloff, Taylor & Zafman

[57] ABSTRACT

Gripper apparatus and method of gripping containers for use in uncasers and the like for controllably gripping containers for transport and release as desired. Each individual gripper utilizes an over center toggle mechanism held to the open position by the toggle and triggerable by the contact of the center of the member with the top of one or more containers to allow a spring to cause the gripper to close on the container walls therebetween. The containers are releasable onto a delivery conveyor by depression of the center member at that point to reset the over center mechanism. The grippers and method are intended to provide for the gripping of multiple containers, typically two, by a single gripper so as to reduce the number of grippers required and to provide for the easy handling of containers not otherwise easily individually gripped. Alternate forms of grippers are described.

11 Claims, 7 Drawing Figures

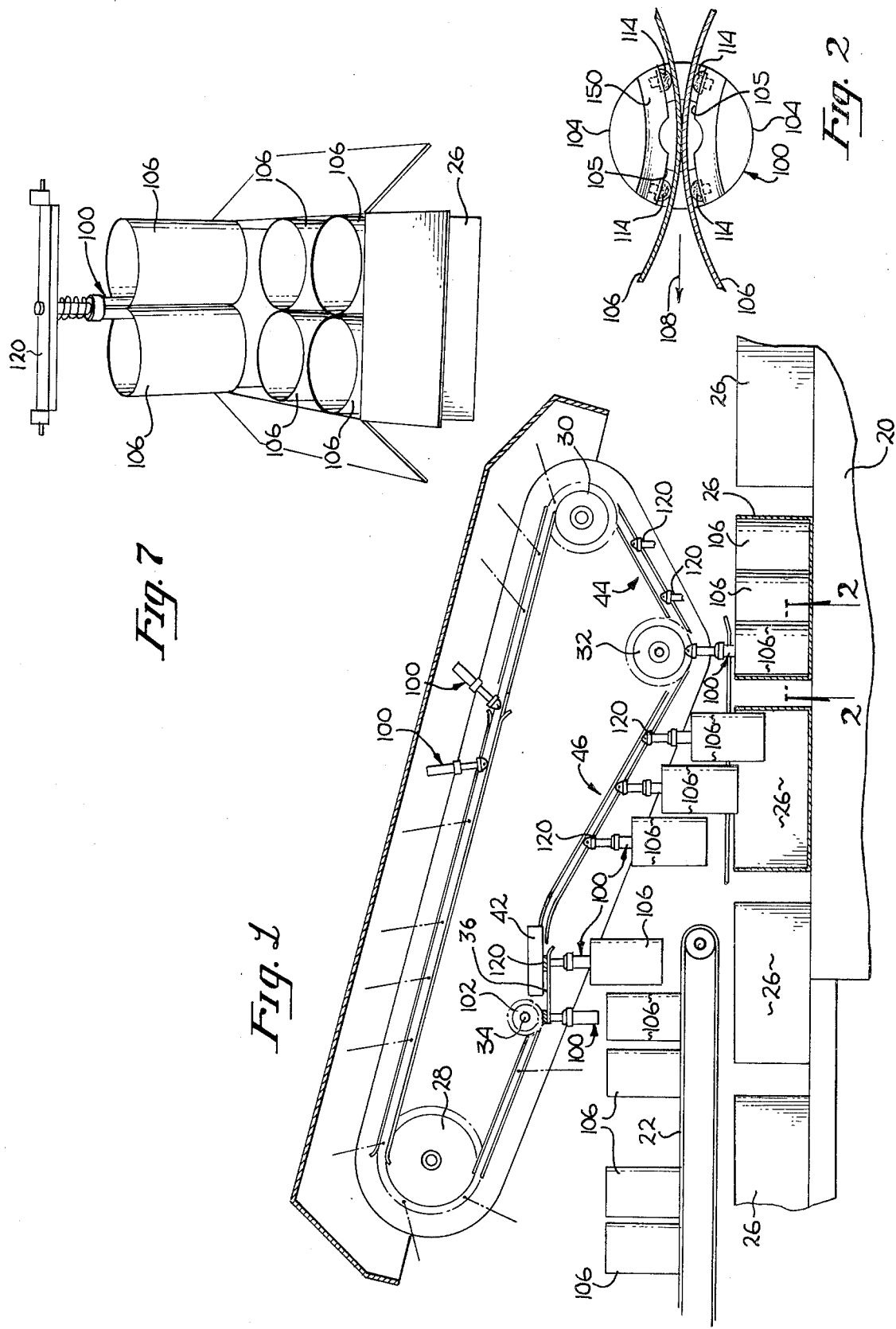

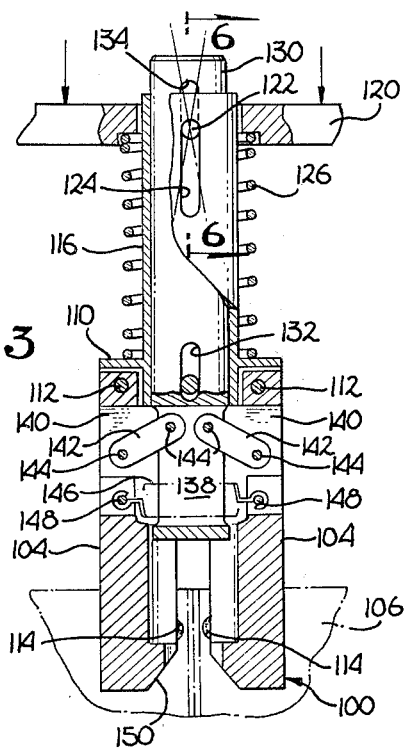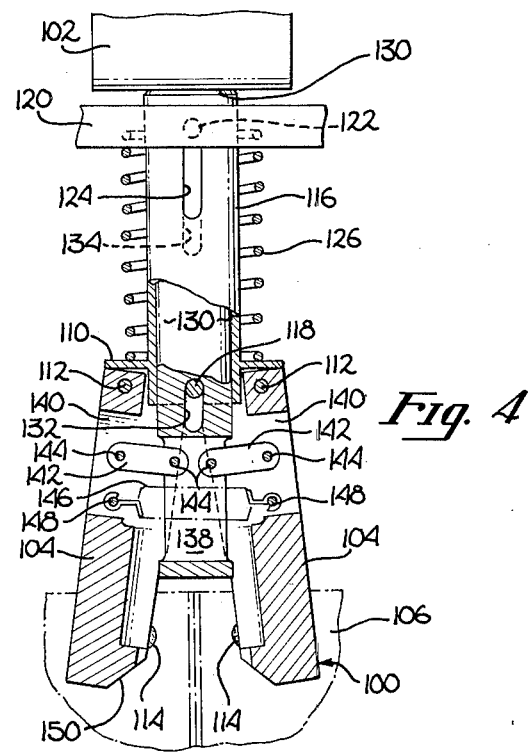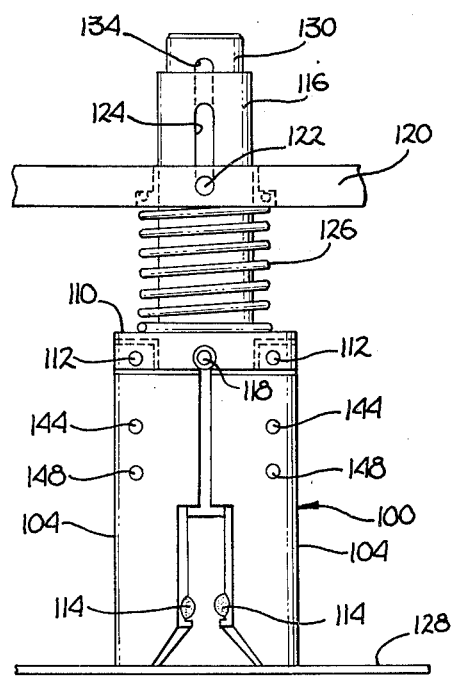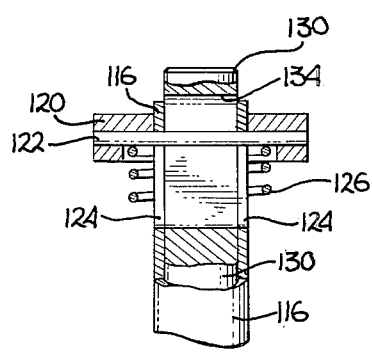

GRIPPER APPARATUS AND METHOD OF GRIPPING CONTAINERS

BACKGROUND OF THE INVENTION

1. Field of the Invention

The present invention relates to the field of container handling apparatus and more particularly to the field of apparatus for handling containers as may be used in container uncasing apparatus and the like.

2. Prior Art

Various types of container handling apparatus are well known in the prior art. Such apparatus includes equipment for handling containers individually and for handling containers in bulk. (Most common of this latter type are conveyor systems which generally transport a continuous stream of containers which are generally unsynchronized with respect to the conveyor system, except as may be accomplished at the entry to a particular piece of equipment fed by the conveyor, or as may naturally result from the delivery of containers to the conveyor by equipment individually handling the containers.)

Equipment for individually handling containers generally has certain physical constraints within which it must operate. In particular, containers are commonly encountered by such equipment supported from the bottom thereof, whether on a conveyor or in cases from which they are to be removed. If located on a conveyor, reasonable access to both the sides and the top of the containers is generally available, so that grippers for individually receiving containers from a conveyor system may engage the containers from the side or top (or both) depending upon the purposes for which they are to be individually handled and the perference of the equipment designer. In certain situations, however, side access to containers is not available, and access from above has certain inherent physical constraints limiting the nature of the grippers which might be considered for use.

The most notable of the foregoing limitations is encountered in uncasers, that is, equipment for removing empty containers from cases or cartons in which they are received and delivering the containers to a container filling system. It is common practice for containers for certain products to be shipped to the product manufacturer by the container manufacturer in cardboard boxes having the top flaps folded but not sealed. These boxes are marked with the appropriate marking of the product manufacturer (not the container manufacturer) so that the product manufacturer may remove the containers, fill the containers with its product and replace the containers in the boxes for sealing and shipment. In this manner boxes are essentially reused so as to provide maximum convenience in handling both the empty containers and the filled containers. However, equipment is needed for removing containers from cartons and cases where side access is unavailable. In such instances heretofore each individual container must be engaged from above to be positively lifted from the carton or case and then controllably released, typically on a conveyor system for transport to the next stage of the filling process.

The tops of the containers handled by such apparatus vary considerably, ranging from narrow mouth containers characteristic of soft drink bottles and the like, to wide mouth containers as are now used for products such as peanut butter, and to "tin", aluminum and foil fiber cans having a substantially cylindrical shape and a wide range of size. Apparatus for handling narrow mouth containers is well known in the prior art, with one example of such equipment being disclosed in U.S. Pat. No. 3,938,847. Apparatus for handling wide mouth containers is also known in the prior art, with one example of such equipment being disclosed in U.S. Pat. No. 4,032,185. However, that apparatus has some limitations when used for straight cylindrical containers (cans), even when special friction elements are placed on the gripper finger tips, and is inconvenient for large containers, such as by way of example, gallon sizes and larger.

Also known are grippers for retaining containers from within having some form of pneumatic apparatus, depending upon the actuation of a pneumatically expandable and contractable bladder in each gripper to provide the gripping and release functions. Such grippers generally operate satisfactorily, though result in certain complexities because of the requirement of a vacuum or pressure source as a prime mover, the connection of each individual gripper on a transport mechanism to the pressure or vacuum source, and the control of the pressure or vacuum source for individual grippers to provide the gripping and release at the appropriate points of progress of the transport system.

Finally, other grippers, generally relating to nonanalagous arts, are disclosed in U.S. Pat. Nos. 1,504,566; 2,610,082; 2,885,010; 2,491,682; 2,155,620; 3,064,855; and 2,789,859.

BRIEF SUMMARY OF THE INVENTION

Gripper apparatus and method of gripping containers for use in uncasers and the like for controllably gripping containers for transport and release as desired. Each individual gripper utilizes an over center toggle mechanism held to the open position by the toggle and triggerable by the contact of the center of the member with the top of one or more containers to allow a spring to cause the gripper to close on the container walls therebetween. The containers are releasable onto a delivery conveyor by depression of the center member at that point to reset the over center mechanism. The grippers and method are intended to provide for the gripping of multiple containers, typically two, by a single gripper so as to reduce the number of grippers required and to provide for the easy handling of containers not otherwise easily individually gripped. Alternate forms of grippers are described.

BRIEF DESCRIPTION OF THE DRAWINGS

FIG. 1 is a side view of a case unloader generally in accordance with U.S. Pat. No. 3,938,847 illustrating the mounting and operation of the present invention gripper in conjunction with such apparatus.

FIG. 2 is a view taken along line 2—2 of FIG. 1.

FIG. 3 is a partial cross-section taken through an individual gripper in the closed or gripping position.

FIG. 4 is a partial cross-section taken through an individual gripper illustrating the manner of opening the gripper by the rollers 102 of FIG. 1.

FIG. 5 is a view illustrating the vertical deflection of an entire gripper upon encountering an obstruction such as a closed carton flap.

FIG. 6 is a view taken along line 6—6 of FIG. 3.

FIG. 7 is a view illustrating the removal of the containers from a carton by the apparatus of the present invention.

DETAILED DESCRIPTION OF THE INVENTION

The present invention comprises gripping apparatus for the handling of containers, typically cans and can-like containers, as may be encountered in the various processing and packaging industries. The invention disclosed in detail herein is designed and configurated for use in a "case unloader" to adapt such equipment for the removal of cylindrical and near cylindrical and other similar containers from cartons or cases by simultaneously gripping two containers from within the opening thereof in a region adjacent the point or line of closest proximity with a single gripper. More particularly, the specific embodiment disclosed herein is designed to be mountable on the apparatus of the full depth uncaser disclosed in U.S. Pat. No. 3,938,847; accordingly, only certain aspects of that apparatus will be described herein, the remainder of such apparatus being described in detail in the foregoing patent.

Referring now to FIG. 1, a cross section through the case unloader of U.S. Pat. No. 3,938,847 incorporating the present invention may be seen. This cross section in essence shows the various general functional elements of the case unloader in a rather schematic form, thereby illustrating the purpose and manner of use of the specific embodiment of gripper hereinafter disclosed in detail. The case unloader is designed to operate in conjunction with a case feeder system, generally indicated by the numeral 20, for providing cases to be unloaded to the uncaser, and a receiving conveyor 22 for receiving the containers 106 removed from the cases 26 on the feeder system 20. The uncaser utilizes a continuous chain at each side thereof supported on the one side shown by sprockets 28, 30, 32 and 34, and further guided by slides between the sprockets which, among other things, establish a short, relatively straight horizontal chain path in the region 36 above the receiving conveyor 22. The individual grippers 100 are supported on horizontal bars 120 extending between like positions on the two adjacent chains and guided at various times on guides at each end of the bars 120 by cam-like slide devices to determine the angular orientation (position of the center line) of the grippers as suggested in FIG. 1. In region 36 the angular orientation of the bars 120 is further determined by a slide member 42 positioned to intersect and stabilize the bars at the position immediately above the entry to the receiving conveyor 22. As disclosed in the foregoing patent, the downward slope of the gripper trajectory in region 44 is the same as the upward slope in region 46, so that by spacing the grippers slightly further apart on the chain than the containers in the cases to be unloaded, and by having the linear speed of the chain slightly higher than the linear speed of the cases in accordance with the incline of chain sections 44 and 46, the grippers will generally be accurately aligned with the container positions in the cases, both in the downward portion of the trajectory (in Section 44) and during the container removal portion of the trajectory (Section 46).

The construction of the individual grippers 100 is illustrated in FIGS. 2 through 6. FIG. 2 is a view taken along line 2—2 of FIG. 1, illustrating one possible orientation of the grippers in the uncaser with respect to the path of the cases thereunder. In particular, two gripper members 104 are adapted to close so as to squeeze together and grip two adjacent containers 106, with the gripper members 104 being split into separate members along an uncaser longitudinal plane, i.e., aligned with the direction of motion of the cases, generally indicated by the arrow 108. The purpose of aligning the grippers in this manner is to allow for the gripping of sidewise adjacent containers as may be appropriate in cases or cartons that are two containers wide, a two by three (six containers total) being but one common size or larger containers. However, it is clear that other orientations for gripping two containers at once are also possible, such as gripping two longitudinally adjacent containers. For that matter, an uncaser head may have combinations of gripper orientations and locations as desired.

The grippers are comprised of first and second gripper members 104, together approximately defining an annular structure and each having arc shaped regions 105 supporting rubber (high friction) buttons 114 in basically a facing disposition. Each of the gripper members 104 extend upward into an appropriately disposed support member 110, and are rotationally supported thereby by pins 112. Thus, the gripper members 104 may rotate about the pins from a closed position as indicated in FIG. 3 to an open position, indicated in FIG. 4. The support members 110 are retained to a metal cylindrical member 116 by a pin 118. The cylindrical members 116 extend upward to be retained by a cross member 120, forming a portion of a transport means, by a pin 122. The cylindrical member 116 has a slot 124 therein so as to be moveable, within limits in a vertical direction. A coil spring 126, extending between member 110 and a cross member 120, yieldably encourages the gripper assembly into the position shown in FIG. 3, but upon striking an obstruction such as a closed flap 128 on a carton containing the containers, the gripper assembly may move upward with respect to the cross bar 120 by the compression of the coil spring, as shown in FIG. 5.

Within the cylindrical member 116 and extending downward between the two gripper members 114 is an actuator member 130. This member extends upward above the top of cylindrical member 116 and downward so as to be engageable with the top of a bottle as shown in FIG. 3. The actuator member 130 is adapted for vertical motion within the limits defined by the slot 132 in the actuator member through which pin 118 passes. The actuator member 130 also has a slot 134 through which pin 122 passes, so as to not restrict motion of the actuator member by the pin 122. The actuator member has a large slot 138, with cooperatively disposed slots 140 in the gripper members 104. Within these slots are a pair of coupling members 142 each coupled to the actuator member and one of the gripper members at the ends thereof by pins 144. Adjacent the bottom of slots 140 is a coil spring 146 loaded in tension and supported as shown by pins 148. Thus, with the actuator member in the position shown in FIG. 3, coil spring 146 encourages the two gripper members into closer separation, thereby forcing the rubber buttons against the upper inside side walls of two adjacent containers 106. When engaging containers as shown, pin 118 not quite engages the bottom of slot 132, so that the actuator member 130 will not restrict the closing of the gripper members 114.

The manner of support and guiding of the cross members 120 is described in detail in U.S. Pat. No. 3,938,847. However, it is to be noted that at the release point for the bottles, the cross bars 120 pass under rollers 102 which are aligned with the grippers. This is shown in detail in FIG. 4, where it is shown that a roller 102 is disposed so as to engage and depress the top of the actuator member 130, thereby forcing the gripper member 104 to the open position and further deflecting the coupling members 142 past "center" so as to lock the gripper assembly at this condition by the orientation of the coupling members 142, the coil spring 146 and the engagement of pin 118 with the top of the slot 132 in the actuator member. It should be noted also that when the gripper is open, as shown in FIG. 4, thereby releasing the two containers 106, the gripper may still be forced upward against the coil spring 126 in the same manner as shown in FIG. 5. Further, it should be noted that since the gripper is normally supported by the engagement of pin 122 with the top of slots 124 in member 116, thereby supporting the assembly fore and aft of the actuator member, engagement of the actuator member 130 with the roller 102 provides an aligning force on the gripper, encouraging it to remain in the vertical orientation.

When a gripper progresses to a position just below sprocket 32 (FIG. 1), the lower end of the actuator member 130 will engage the top edge of the two containers immediately therebelow so as to be forced slightly upward, thereby tripping the over center mechanism and allowing the coil spring 146 to pull the gripper members 104 against the upper inside region of the two containers, thereby forcing the two containers together, and forcing the actuator member 130 further upward. Thus it may be seen that the gripper members 104 are coupled to an over-center mechanism or toggle mechanism, which may retain the grippers in the open position but allow the rapid triggering of the mechanism for the engagement of the actuator members with the tops of adjacent containers to provide almost instantaneous gripping of the containers. In the event no container is disposed beneath the gripper as it passes sprocket 32, the gripper will remain in the open condition until again passing sprocket 32 and engaging a pair of containers. Similarly, once the grippers are opened by roller 102, they will remain open until engaging a container so as to close. Thus it may be seen that the rubber buttons 114 both cushion the impact of the gripper members 104 with the containers, and further provide a relatively high frictional force therewith (The gripper members 104, coupling members 142 and the actuator member 130 in the preferred embodiments are of the self lubricating molded plastic).

The lower portion of the gripper members have a chamfer 150 thereon so as to encourage the alignment of the gripper with the region of closest proximity of the two containers to be gripped and to encourage the containers together. For this to be accomplished in the event of misalignment, some repositioning of the container may occur. To further accomodate this action, the hole in the cross member 120 through which metal cylindrical member 116 passes is purposely made a predetermined amount larger than the cylindrical member so as to allow for some sidewise deflection of the lower portion of each gripper to align the gripper with the containers. This sidewise motion, however, is limited by the binding of cylindrical member 116 with the hole so as to prevent the sidewise deflection from being excessive.

Now referring to FIG. 7, a pictorial view illustrating an individual gripper on a gripper support removing a pair of containers from a carton may be seen. Illustrated in that figure is a carton containing six containers with a two by three orientation so that a single gripper 100 on each of three appropriately disposed bars 120 will remove all six containers from the carton. Obviously, of course, a single bar could carry two grippers and be positioned so that each gripper would pick up two longitudinally adjacent containers, leaving two sidewise adjacent containers at one end of the carton for a two by three carton for pick-up by a single gripper as shown in FIG. 7, or as another example, leaving four containers for pick-up by two grippers on a second bar 120 for a two by four carton.

A preferred embodiment of the present invention has been disclosed and described in detail herein with respect to relatively large open top containers basically in the form of open top cylindrical cans. Such containers, whether in the form of tin cans, paper foil containers or other forms of containers may readily be gripped in pairs by this embodiment and transported so long as they have a generally cylindrical shape, even though such containers may contain regions, typically at the very top thereof, which are somewhat flared out or rolled in to cooperate with the top with which they will ultimately be sealed. Generally speaking, the method of the present invention, that is the method of gripping at least two containers by gripping at their adjacent walls, is of course generally applicable to containers packed in cartons and the like which do not include dividers or at least dividers extending to the gripping elevation. In that regard normally glass containers are shipped with dividers in the carton, generally making the present invention inapplicable in such situations. The concepts of the present invention, however, may be applicable to plastic containers of a generally cylindrical shape, even if provided with screw cap tops, provided the proportions are such as to reasonably allow the free passage of two gripper members over the top edge to allow the gripping of the appropriate portion.

It should be noted that the present invention has been disclosed and described with respect to an embodiment utilizing an over-center toggle mechanism so that the gripper members have two stable positions, that is the open position and the gripping position. The concepts however of transporting two or more containers by gripping at the adjacent container walls are readily applicable to other grippers such as, by way of specific example, grippers which are spring loaded to the gripping position but which may be opened by force on an actuating member, returning to the closed position whenever the force on the actuating member is removed. While the invention is applicable to still other gripper concepts, it is particularly well suited for use with grippers spring loaded to the closed or gripping position and ideally suited for grippers having a toggle mechanism to define two stable gripper positions. Finally, while the present invention has been disclosed and described with respect to a preferred embodiment having two gripper members, the concept could be extended to grippers having additional gripper members such as, by way of example, four, each of the four extending into one of the four containers so that four containers could be simultaneously held by the gripper, though in general it is believed that greater simplicity and more reliable operation would be achieved by using two grippers of the general type disclosed herein. Thus, while the preferred embodiment has been disclosed herein, it will be understood by those skilled in the art that various changes in form and detail may be made therein without departing from the spirit and scope of the invention.

I claim:

1. In a container handling apparatus, a container gripper comprising:
   a support means having a generally vertically disposed longitudinal opening therein;
   first and second gripping members disposed in a generally vertical disposition and pivotally supported adjacent the upper end thereof by said support means, said gripping members having generally facingly disposed surfaces adjacent their lower end for gripping the walls of two containers therebetween, said gripping members being rotatable between a first position whereby the lower ends of said gripping members are encouraged into closer proximity to be closeable against a wall of one of said two containers and an adjacent wall of the other of said two containers therebetween to clamp two containers together and grip them between said gripper members and a second position not engaging container walls, said gripping members having first and second ends;
   spring means for encouraging said gripping members to said first position;
   an elongate, generally vertically disposed actuator member extending downward between said first and second gripping members, said actuator member being moveable in a vertical direction between an upper third position and a lower fourth position, said actuator member being a means for contacting the top edges of containers and moving toward said third position, said actuator member being generally disposed within said longitudinal opening and extending above said support means so as to be forceable into said fourth position by engagement from above with a depression means; and
   over-center toggle means, said toggle means being coupled between said first and second gripping members and said actuator member, said toggle means being a means for allowing said first and second gripping members to be moved by said spring means toward said first position as said actuator member moves toward said third position, and for locking said actuator member at said fourth position and said first and second gripping members at said second position by the over-center action of said toggle means, whereby said first and second gripping members will snap to said first position and said actuator member to said third position as said actuator is encouraged to move from said fourth position.

2. A plurality of bottle grippers of claim 1 further comprised of coil springs, retaining means, a transport means and a mounting means, said transport means being a means for supporting and moving said mounting means along a predetermined path, said mounting means having a hole therethrough for each of said grippers a predetermined amount larger than the adjacent cross-section of said support means, said support means of each said gripper extending upward through one of said holes, said retaining means being a means for slideably retaining said support means with respect to said mounting means to prevent said support means from being encouraged downward out of said holes, each of said coil springs being disposed in compression over one of said support means between said mounting means and the lower portion of said support means to yieldably encourage each of said grippers in a downward direction.

3. The gripper of claim 1 wherein the lower end of said gripping members have a substantial chamfer on the facingly disposed lower edges thereof so as to be engageable with container tops to encourage said container tops and the respective said gripper into relative disposition with a portion of the upper wall of each of two containers between said gripping members.

4. The grippers of claim 1 wherein the facingly disposed lower portions of said gripping members have rubber inserts thereon so that said rubber inserts are engageable with the upper wall of the containers when said gripping members are in said first position.

5. A method of gripping open topped containers comprising the steps of:
   (a) providing a gripper characterized by first and second gripper members extending generally downward, the gripping members being moveable from a first position of substantial separation allowing the free passage of two container walls therebetween to a second position of lesser separation for clamping the adjacent walls of two containers together and gripping two container walls therebetween;
   (b) with the gripper members in the first position, moving the gripper downward over a pair of containers in the approximate region of closest separation of the two containers so that one gripper member projects into one container and the other gripper member projects into the second container;
   (c) moving the gripper members from the first position to the second position to grip the adjacent walls of the two containers and to clamp the two containers together;
   (d) transporting the gripper to a container delivery region, and
   (e) moving the gripper members from the second position to the first position to release the containers.

6. The method of claim 5 wherein the gripper provided in step (a) has gripper members spring loaded to the second position whereby the gripper members will automatically retain the containers during step (d).

7. The method of claim 5 wherein the gripper provided in step (a) is provided with a spring loaded over-center toggle mechanism for holding the gripper members in the first position and releasable on contact of an actuator member with the top edge of a container to move the gripper members to the second position, and wherein step (c) is accomplished upon contact of the actuator member with the top edge of the containers during step (b).

8. A method of gripping open topped containers comprising the steps of:
   (a) extending a gripper member into each of a plurality of containers through the open top thereof;
   (b) moving the gripper members into closer proximity to each other so as to retain the containers by forcefull contact of the containers with the gripper members and with each other;
   (c) transporting the gripper members to a container delivery region;
   (d) moving the gripper members further apart, and
   (e) withdrawing the gripper members from the containers.

9. The method of claim 8 wherein step (b) is performed by allowing at least one spring to encourage the gripper members into closer proximity.

10. In a container handling apparatus, a container gripper comprising:
- a support means having a generally vertically disposed longitudinal opening therein;
- first and second gripping members disposed in a generally vertical disposition and pivotally supported adjacent the upper end thereof by said support means, said gripping members having generally facingly disposed surfaces adjacent their lower end for gripping the walls of two containers therebetween;
- said facingly disposed surfaces including a substantially chamfered surface comprising an inverted convex conical surface engageable with container tops to encourage said container tops and the respective said gripper into relative disposition with a portion of the upper wall of each of two containers between said gripping members;
- said gripping members being rotatable between a first position whereby the lower ends of said gripping members are encouraged into closer proximity to be closeable against a wall of one of said two containers and an adjacent wall of the other of said two containers therebetween to clamp two containers together and grip them between said gripper members and a second position not engaging container walls, said gripping members having first and second ends;
- spring means for encouraging said gripping members to said first position;
- an elongate, generally vertically disposed actuator member extending downward between said first and second gripping members, said actuator member being moveable in a vertical direction between an upper third position and a lower fourth position, said actuator member being a means for contacting the top edges of containers and moving toward said third position, said actuator member being generally disposed within said longitudinal opening and extending above said support means so as to be forceable into said fourth position by engagement from above with a depression means; and
- over-center toggle means, said toggle means being coupled between said first and second gripping members and said actuator member, said toggle means being a means for allowing said first and second gripping members to be moved by said spring means toward said first position as said actuator member moves toward said third position, and for locking said actuator member at said fourth position and said first and second gripping members at said second position by the over-center action of said toggle means, whereby said first and second gripping members will snap to said first position and said actuator member to said third position as said actuator is encouraged to move from said fourth position.

11. In an apparatus for handling containers having generally straight cylindrical walls, a container gripper comprising:
- a support means having a generally vertically disposed longitudinal opening therein;
- first and second gripping members disposed in a generally vertical disposition and pivotally supported adjacent the upper end thereof by said support means, said gripping members having generally facingly disposed surfaces adjacent their lower end for gripping the walls of two containers therebetween, said gripping members being rotatable between a first position whereby the lower ends of said gripping members are encouraged into closer proximity to be closeable against a wall of one of said two containers and an adjacent wall of the other of said two containers therebetween to clamp two containers together and grip them between said gripper members, said two containers also being in contact with one another at their lower ends and thereby held in the vertical position, and a second position not engaging container walls, said gripping members having first and second ends;
- spring means for encouraging said gripping members to said first position;
- an elongate, generally vertically disposed actuator member extending downward between said first and second gripping members, said actuator member being moveable in a vertical direction between an upper third position and a lower fourth position, said actuator member being a means for contacting the top edges of containers and moving toward said third position, said actuator member being generally disposed within said longitudinal opening and extending above said support means so as to be forceable into said fourth position by engagement from above with a depression means; and
- over-center toggle means, said toggle means being coupled between said first and second gripping members and said actuator member, said toggle means being a means for allowing said first and second gripping members to be moved by said spring means toward said first position as said actuator member moves toward said third position, and for locking said actuator member at said fourth position and said first and second gripping members at said second position by the over-center action of said toggle means, whereby said first and second gripping members will snap to said first position and said actuator member to said third position as said actuator is encouraged to move from said fourth position.

* * * * *